(12) United States Patent
Keller et al.

(10) Patent No.: US 7,570,854 B2
(45) Date of Patent: Aug. 4, 2009

(54) FLAT WIDE WATER SWELLABLE BINDER FOR OPTICAL FIBER TUBES

(75) Inventors: David Keller, Cary, NC (US); Daniel Poole, Fuquay Varina, NC (US)

(73) Assignee: Nexans, Paris (FR)

( * ) Notice: Subject to any disclaimer, the term of this patent is extended or adjusted under 35 U.S.C. 154(b) by 0 days.

(21) Appl. No.: 12/006,253

(22) Filed: Dec. 31, 2007

(65) Prior Publication Data

US 2009/0169159 A1 Jul. 2, 2009

(51) Int. Cl.
*G02B 6/44* (2006.01)
(52) U.S. Cl. .................. 385/110; 385/100; 385/109
(58) Field of Classification Search .......... 385/100–114
See application file for complete search history.

(56) References Cited

U.S. PATENT DOCUMENTS

| 5,905,834 | A | * | 5/1999 | Anderson et al. | 385/111 |
| 6,035,087 | A | * | 3/2000 | Bonicel et al. | 385/109 |
| 2002/0097966 | A1 | * | 7/2002 | Zelesnik | 385/100 |

* cited by examiner

*Primary Examiner*—Sung H Pak
*Assistant Examiner*—Daniel Petkovsek
(74) *Attorney, Agent, or Firm*—Sofer & Haroun, LLP

(57) ABSTRACT

A multi-tube optical fiber cable includes a plurality of optical fiber tubes, each having one or more optical fibers loosely arranged therein. The optical fiber tubes are arranged within an outer jacket, where the tubes are constructed of a polymer having a low Young's constant modulus. A binder is arranged around the plurality of optical fiber tubes, where the binder is substantially flat in shape such that there is no deformation of the tube, when the binder is applied.

7 Claims, 2 Drawing Sheets

FLAT WIDE WATER SWELLABLE BINDER FOR OPTICAL FIBER TUBES

FIELD OF THE INVENTION

The present invention is related to optical fiber cables. More particularly, the present invention is related to an improved binder for optical fiber cables.

BACKGROUND

Optical fiber cables have many designs for including multiple fibers within a single cable. Once such design is to include one or more "loose" tubes within a larger cable jacket, each of the tubes having one or more optical fibers loosely arranged therein. One such arrangement for these optical cables, shown in prior art FIG. 1, is for four tubes, each having twelve fibers therein, to be arranged within an outer jacket. Other elements are typically included within the outer jacket include strength members and binders.

The strength members are used to provide pulling tension support during installation of the cable, and binders are used to keep the multiple loose tubes in a central and tightly arranged configuration to protect against installation stresses caused by the bending and pulling of the cable. Typical binders are 2-3 mm in thickness, and may include a water swellable material (for added protection against moisture) and applied to the loose tubes, prior to jacketing under approximately 500-1000 grams of tension.

Another aspect of construction of cables of this sort is the selection of the polymers used to form the tubes and jacket. The selection of polymers for use in the tubes and jacket is a combination of cost, ease of use, crush resistance, environmental protection, installation flexibility, production quality (extrusion line speed), fire safety concerns etc. . . . .

One such factor that affects these issues is the Modulus (Young's Constant) of the polymer chosen. Polymers with a higher modulus, such as those in the range resulting in a tensile strength of 4,000-10,000 PSI, are suitable in such cables particularly for use in crush resistance and anti-compression.

However, when using these high modulus plastics, the associated expansion and contraction during thermal cycling (caused by exposure to hot and cold temperatures) imparts stress on the underlying fibers. Although binders, such as those shown in FIG. 1, may be used to secure the tubes to a central strength member to alleviate such an effect, such an arrangement has not proven affective and overcoming the problem.

OBJECTS AND SUMMARY

The present invention looks to overcome the drawbacks associated with the prior art by providing a low modulus plastic tubing combined with an improved binder element for use in multi-tube fiber optic cables, which does not result in crushing or deformation of the tubes when applied during cable formation.

To this end, the present invention provides for a multi-tube optical fiber cable having a plurality of optical fiber tubes, each having one or more optical fibers loosely arranged therein. The optical fiber tubes are arranged within an outer jacket and the tubes are constructed of a polymer having a low Young's modulus constant, such as those in the range of 2500-2800 PSI.

A binder is arranged around the plurality of optical fiber tubes and is substantially flat in shape such that there is no deformation of the tube, when the binder is applied.

This arrangement allows for an optimized cable construction that allows for both a 1500-2500 g binder tension, required for coupling the fiber tubes to the central strength member during environmental changes while simultaneously preventing deformation of the tubes during application of the binder, even when the tubes are constructed of a polymer with a low Young's modulus constant.

BRIEF DESCRIPTION OF THE DRAWINGS

The present invention can be best understood through the following description and accompanying drawings, wherein.

DETAILED DESCRIPTION

Figure 1:
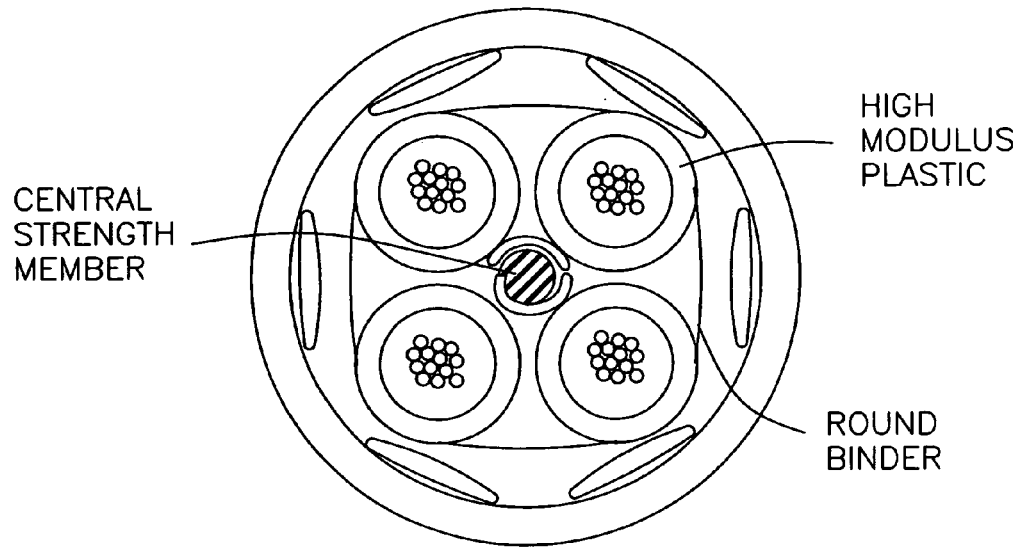
FIG. 1 illustrates a prior art multi-tube fiber optic cable using tubes constructed of high Young's constant modulus.
Figure 2:
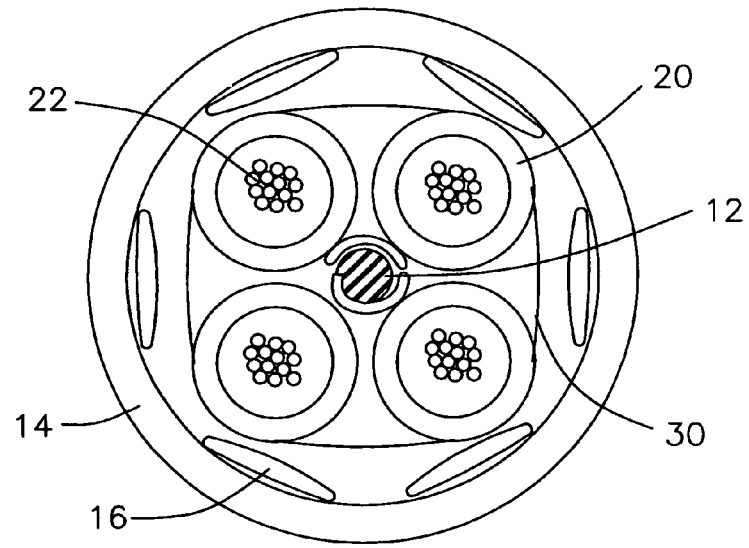
FIG. 2 illustrates a cross section of a multi-tube fiber optic cable having a flat binder according to one embodiment of the present invention.

In one embodiment of the present invention, FIG. 2 illustrates a multi-tube fiber optic cable 10. In the illustrated arrangement, cable 10 maintains a central strength member 12, an outer jacket 14, a plurality of water swellable yarns 16 and four fiber optic tubes 20, each having a number of optical fibers 22 therein.

Strength member 12 is typically construed of Glass Reinforced Plastic (GRP) but may be made from any material that is useful in providing lightweight rigidity to cable 10. Water swellable yarns 16 are typical yarns including SAP (Super Absorbent Plastics), or SAP resins that are useful for preventing water or moisture damage to the fibers 22.

Optical fibers 22 are typical UV coated 250 micron optical fibers according to the present example. However, it is understood that modified fibers of any similar design may be substituted, including tight buffer fibers.

Jacket 14 and tubes 20 are made from an extruded polymer composition having a low Young's modulus constant. For example, in one exemplary arrangement, tubes 20 and Jacket 14 are constructed of Low modulus FRPVC (Fire Resistant Poly Vinyl Chloride) having a resulting tensile strength in the range of 1800-2800 PSI.

In one embodiment, jacket 14 may be constructed of different material than is used for tubes 20 to provide additional crush resistance to cable 10 if necessary.

The use of low-modulus plastics, such as those resulting in a tensile strength range of under 2800 PSI have been advantageously used for the tubes 20 because they provide better results against shrinkback after extrusion as well as resisting shrinkage in response to cold temperature exposure. The starting modulus and lower tensile strength enables a lower rigidity at the lower glass transition point (or temperature where the plastic is cold and brittle) making tubes 20 less likely to crack at typical operating and handling temperatures. Lower forces exerted from temperature expansion and contraction over temperature, given the lower modulus of the materials, results in an expanded operation window.

Figure 3A:
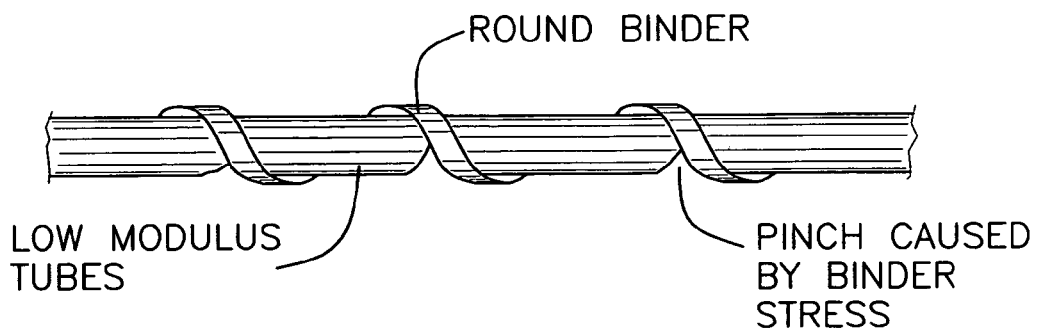
FIG. 3A shows a longitudinal illustration of the optic cable using a low Young's modulus constant with a round binder.

However, when using low modulus plastics for tubes 20 in combination with typical round binders, the tension of the binders when applied are such that the tubes may be crushed or deformed. For example, FIG. 3A shows a low modulus plastic being crushed by the helically wound typical round binders.

Figure 3B:
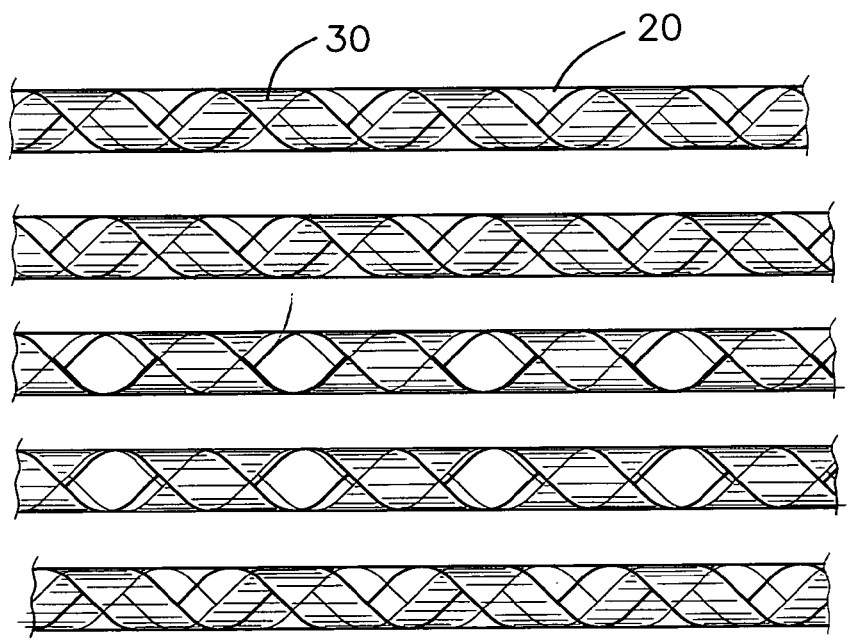
FIG. 3B illustrates a longitudinal view of the multi-tube fiber optic cable having a flat binder from FIG. 2.

In one embodiment of the present invention, as illustrated in FIGS. 2 and 3B, binder 30 is contained within jacket 14 of cable 10, binding each of the four tubes 20 so that they maintain the positions within cable 10 during formation and installation.

In one embodiment binder 30 is made using the same multi-filament binder polymers used in the prior art such as polyester 1500 denier (1500 g/9000 m) weight/length. However, unlike the prior art, the filaments are flattened into a thin arrangement of approximately 6 mm in width. In one arrangement, to reach the 6 mm width, two or four 1500 denier binders may be used and formed into a single flat binder 30.

It is noted that the construction of flat binder 30 may be composed in different manners. For example, binder 30 may be composed of four 1500 denier polyester (multi-filament) yarns that are impregnated with a waster swellable compound and rolled flat, held together by a resin after drying or curing. The combination of four yarns to form binder 30 allows the binder to have an improved "fold-ability" if necessary during the application process without rendering an obtrusive fold shape. Such a multi-filament yarn, when laid down on tubes 20, may exhibit an improved adhesion to tubes 20 with respect to a standard extrusion-line bobbin supported application. Additionally, the use of a multi-filament yarn for binder 30 provides a more robust construction with oval-ized edges that prevent tears in tubes 20 from mechanical encounters with binder 30.

In another arrangement, binder 30 may be formed using a suitably shaped tape similar to the above described wide/flat dimensions only constructed using a single material construction.

In one embodiment binder 30 is applied at a tension that just begins the compression of the tubes 20. The tension of application is preferably set such that wide-flat binder 30 securely anchors tubes 20 to the CSM (central strength member) 12 over the intended operation temperature range for cable 10. As shown in FIG. 3B, this results in a neatly applied flat binder 30. Alternatively, as noted above, FIG. 3A shows how a traditional round binder, such as that used in prior art arrangements, would affect tubes constructed of a polymer having a low Young's modulus.

This anchoring of tubes 20 to the glass reinforced CSM or central strength member 12, caused by application of flat binder 30, renders a balancing or summation of the expansion and contraction tendencies of the total packages (cable 10), rendering a more strain free environment for fiber 22 within tubes 20. Such optimal binding of tubes 20 to CSM 12 is done, even with the low Young's constant modulus polymer for tubes 12, without deforming or crushing tubes 12 as a result of the wide-flat binder 30.

In one arrangement, as shown in FIG. 3B, binder 30 is applied helically around the core of tubes 20 in a first direction and again in a reverse direction resulting in the crossed arrangement as shown. This is done using two traditional extrusion line binder heads, each working in opposite helical directions, just prior to extrusion of the jacket 14. It is noted that although FIG. 3B shows two, oppositely wound binders 30, less (such as one helically wound binder 30, or even more (4—two pairs of helical binders 30, each pair in a reverse winding direction from one another) may be used depending on the desired binder strength or other related factors. The resulting arrangement provides for a flat laying binder 30 that rests flat against the uneven tube 20 surface without the rendering of erupting edges from uneven tension distribution.

As such, the resulting cables 10 is formed such that binder 30 is applied to the four tubes 20 in such manner that, even though the modulus of the polymer used is low, binder 30 during application does not cut into tubes 20 because of the wide flat shape of binder 30.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A multi-tube optical fiber cable, said cable comprising:
   a plurality of optical fiber tubes, each having one or more optical fibers loosely arranged therein, said optical fiber tubes being arranged within an outer jacket, where in said tubes are constructed of a polymer having a low Young's constant modulus having a tensile strength substantially in the range of 1800-2800 PSI; and
   a binder arranged around said plurality of optical fiber tubes, wherein said binder is substantially flat in shape such that there is no deformation of said tubes, when said binder is applied.

2. The multi-tube optical fiber cable as claimed in claim 1, wherein said polymer for said tubes is FRPVC (Fire Resistant Poly-Vinyl Chloride).

3. The multi-tube optical fiber cable as claimed in claim 1, wherein said binder is formed from a plurality of combined polyester yarns.

4. The multi-tube optical fiber cable as claimed in claim 3, wherein said polyester yarns are of substantially 1500 denier.

5. The multi-tube optical fiber cable as claimed in claim 3, wherein said binder is substantially 6 mm in width.

6. The multi-tube optical fiber cable as claimed in claim 1, wherein said binder is applied at a tension sufficient to compress said tubes, without causing deformation.

7. The multi-tube optical fiber cable as claimed in claim 6, wherein said application tension of said binder couples said tubes to a central strength member of said cable.

* * * * *